United States Patent
Haneda et al.

(10) Patent No.: US 11,463,625 B2
(45) Date of Patent: Oct. 4, 2022

(54) ELECTRONIC APPLIANCE, IMAGE DISPLAY SYSTEM, AND IMAGE DISPLAY CONTROL METHOD

(71) Applicant: SHARP KABUSHIKI KAISHA, Sakai (JP)

(72) Inventors: Mitsuhiro Haneda, Sakai (JP); Noriaki Murakami, Sakai (JP); Shohei Takai, Sakai (JP); Takanori Saito, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/172,802

(22) Filed: Feb. 10, 2021

(65) Prior Publication Data

US 2021/0250511 A1  Aug. 12, 2021

(30) Foreign Application Priority Data

Feb. 12, 2020  (JP) .............................. JP2020-021808

(51) Int. Cl.
*H04N 5/232* (2006.01)

(52) U.S. Cl.
CPC ..... *H04N 5/23296* (2013.01); *H04N 5/23219* (2013.01)

(58) Field of Classification Search
CPC ........... H04N 5/23296; H04N 5/23299; H04N 5/2628; H04N 5/23219
See application file for complete search history.

(56) References Cited

U.S. PATENT DOCUMENTS

| | | | |
|---|---|---|---|
| 10,904,446 B1* | 1/2021 | Ostap | H04N 5/23218 |
| 2005/0174451 A1* | 8/2005 | Nozaki | H04N 5/232123 |
| | | | 348/240.99 |
| 2009/0185064 A1* | 7/2009 | Maniwa | H04N 5/23245 |
| | | | 348/333.11 |
| 2009/0190835 A1* | 7/2009 | Lee | H04N 5/23219 |
| | | | 382/190 |
| 2009/0244324 A1* | 10/2009 | Saito | H04N 5/23218 |
| | | | 348/231.99 |
| 2010/0039535 A1* | 2/2010 | Maeda | H04N 5/23296 |
| | | | 348/240.2 |
| 2010/0149383 A1* | 6/2010 | Maeda | H04N 5/23296 |
| | | | 348/E5.022 |
| 2010/0214445 A1* | 8/2010 | Chronqvist | H04N 5/23219 |
| | | | 348/231.99 |

(Continued)

FOREIGN PATENT DOCUMENTS

JP  2014-220724 A  11/2014

*Primary Examiner* — Twyler L Haskins
*Assistant Examiner* — Dwight Alex C Tejano
(74) *Attorney, Agent, or Firm* — ScienBiziP, P.C.

(57) ABSTRACT

An electronic appliance, includes: an imaging apparatus; a display apparatus; and a control apparatus, the control apparatus being configured to: extract, from a moving image captured by the imaging apparatus, subjects included in the moving image and information items each on one of the subjects; generate enlarged-view target information for selecting an enlarged-view target from among the subjects, with reference to the information items; select the enlarged-view target from among the subjects, with reference to the enlarged-view target information; and enlarge a region including the enlarged-view target, and cause the display apparatus to display the moving image.

6 Claims, 6 Drawing Sheets

(56) References Cited

U.S. PATENT DOCUMENTS

| | | | |
|---|---|---|---|
| 2015/0381903 A1* | 12/2015 | Morioka | H04N 5/772 |
| | | | 348/239 |
| 2016/0381281 A1* | 12/2016 | Ueguri | H04N 5/23216 |
| | | | 348/333.02 |
| 2018/0146133 A1* | 5/2018 | Carceroni | G10L 15/22 |
| 2019/0208114 A1* | 7/2019 | Ginat | H04N 19/167 |
| 2020/0267321 A1* | 8/2020 | Gupta | G06V 10/24 |

* cited by examiner

ELECTRONIC APPLIANCE, IMAGE DISPLAY SYSTEM, AND IMAGE DISPLAY CONTROL METHOD

CROSS-REFERENCE TO RELATED APPLICATION

The present application claims priority from Japanese Application JP 2020-21808, the content to which is hereby incorporated by reference into this application.

BACKGROUND OF THE INVENTION

1. Field of the Invention

The present invention relates to an electronic appliance, an image display system, and an image display control method.

2. Description of the Related Art

A technique known in the art involves tracking a part of a moving image, and separately displaying the tracked part. For example, Japanese Unexamined Patent Application Publication No. 2014-220724 discloses a display control apparatus to keep displaying in a first display region an image of a first person selected as a target on track from among people presented in a moving image, and simultaneously display in a second display region an image of a second person presented in the moving image at a time point when the moving image is reproduced.

SUMMARY OF THE INVENTION

A problem of the above technique is that the user himself or herself has to carry out an operation to find and select a subject to be tracked.

An aspect of the present invention is to display a subject in an enlarged view, without a user operation.

In order to solve the above problem, an electronic appliance according to an aspect of the present invention includes: an imaging apparatus; a display apparatus; and a control apparatus. The control apparatus: extracts, from a moving image captured by the imaging apparatus, subjects included in the moving image and information items each on one of the subjects; generates enlarged-view target information for selecting an enlarged-view target from among the subjects, with reference to the information items; selects the enlarged-view target from among the subjects, with reference to the enlarged-view target information; and enlarges a region including the enlarged-view target, and causes the display apparatus to display the moving image.

An aspect of the present invention makes it possible to display a subject in an enlarged view, without a user operation.

DETAILED DESCRIPTION OF THE INVENTION

First Embodiment

Described below in detail is a first embodiment of the present invention.

An image display system 100 according to this embodiment determines a target-on-track (a zoom-target subject) when a moving image is obtained, using such known techniques as object recognition, composition determination, and personal recognition. Such a feature makes it possible to zoom in on the target and reproduce the moving picture, freeing the user from searching for, and tapping, the target.

Configuration of Image Display System 100

Figure 1:
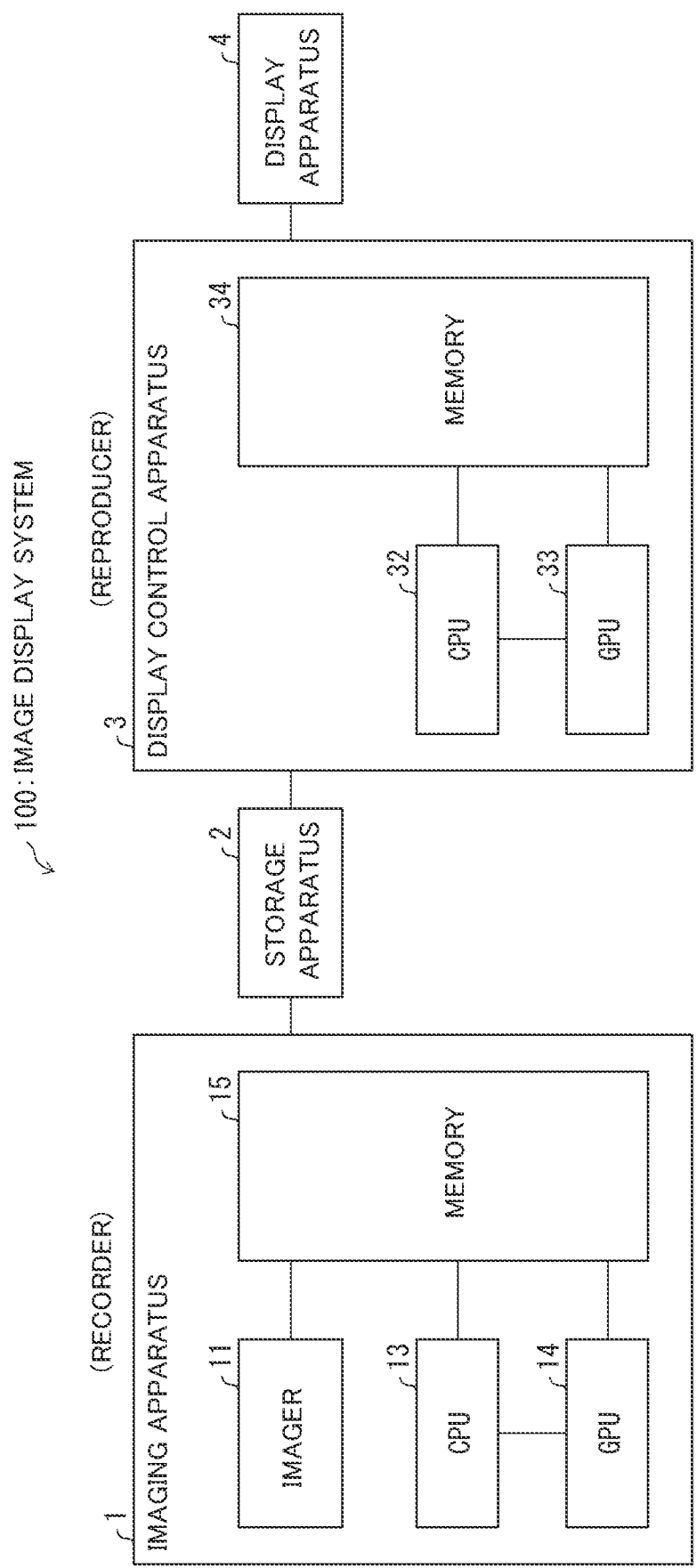
FIG. 1 is a block diagram illustrating a hardware configuration of an image display system according to a first embodiment of the present invention.

FIG. 1 is a block diagram illustrating a hardware configuration of the image display system 100 according to this embodiment. As illustrated in FIG. 1, the image display system 100 includes: an imaging apparatus 1; a storage apparatus 2; a display control apparatus 3; and a display apparatus 4.

The imaging apparatus 1 captures a moving image, and causes the storage apparatus 2 to store the moving image.

The storage apparatus 2 stores various kinds of information. Examples of the storage apparatus 2 include a hard disk drive (HDD), a solid state drive (SSD), and a secure digital (SD) memory card that are either embedded within, or externally connected to, the imaging apparatus 1. The storage apparatus 2 stores a program (e.g., an operation system and an application) and data (including user data) required for the image display system 100 to operate.

The display control apparatus 3, controlling the display apparatus 4, is connected to the display apparatus 4 and the storage apparatus 2. The display control apparatus 3 includes such a device as an integrated circuit (e.g., a system-on-a-chip (SoC)). An example of the display control apparatus 3 is a body of a smart phone, a tablet terminal, or a personal computer (PC). Note that the display control apparatus 3 may perform other control (i.e., communications control) than the display control.

The display apparatus 4 displays an image in a predetermined resolution (a display resolution). An example of the display apparatus 4 is an organic electroluminescent (EL) display, a liquid crystal display, or a projector.

Hardware Configuration of Imaging Apparatus 1

The imaging apparatus 1 includes: an imager 11; a central processing unit (CPU) 13; a graphics processing unit (GPU) 14; and a memory 15.

The imager 11 captures a moving image. The CPU 13 performs various kinds of arithmetic processing such as an operation of an application. The GPU 14 performs an operation on image processing. The memory 15 temporarily stores information required for the arithmetic processing and the image processing.

Hardware Configuration of Display Control Apparatus 3

The display control apparatus 3 includes: a CPU 32; a GPU 33; and a memory 34.

A display controller 31 is interposed between the display apparatus 4 and the storage apparatus 2, and causes the display apparatus 4 to display the data stored in the storage apparatus 2. The CPU 32 performs various kinds of arithmetic processing such as an operation of an application. The GPU 33 performs an operation on image processing. The memory 34 temporarily stores information required for the arithmetic processing and the image processing.

Note that the display apparatus 4 may include the display control apparatus 3. In such a case, an example of the display control apparatus 4 is a body of a smart phone, a tablet terminal, or a PC.

Functional Configuration of Imaging Apparatus 1

Figure 2:
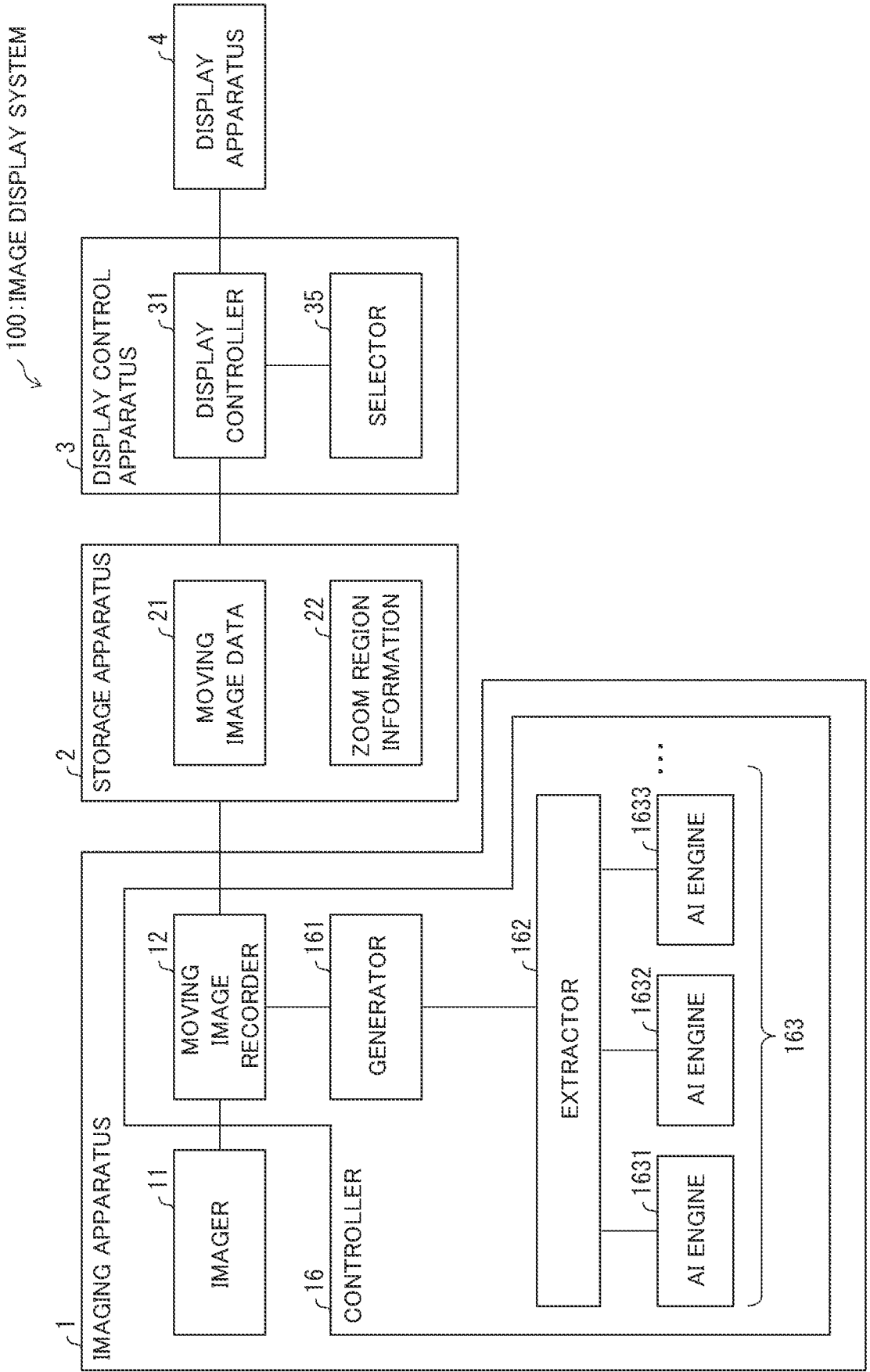
FIG. 2 is a block diagram illustrating a functional configuration of the image display system according to the first embodiment of the present invention.

FIG. 2 is a block diagram illustrating a functional configuration of the image display system 100 according to this embodiment. As illustrated in FIG. 2, the imaging apparatus 1 includes: the imager 11; and a controller 16. The controller 16 includes: a moving image recorder 12; a generator 161; an extractor 162; and an artificial intelligence (AI) engine 163. The storage apparatus 2 stores at least: moving image data (a moving image) 21; and zoom region information 22.

The moving image recorder 12 causes the storage apparatus 2 to store the moving image, captured by the imager 11, as the moving image data 21. When obtaining zoom region information from the generator 161, the moving image recorder 12 causes the storage apparatus 2 to store the obtained zoom region information as the zoom region information 22. The zoom region information 22 includes: an area of a region including a subject; and a magnification of the region.

With reference to information items each on one of subjects included in the moving image captured by the imager 11, the generator 161 generates zoom region information (enlarged-view target information) for selecting an enlarged-view target from among the subjects included in the moving image. Specifically, using a result of recognition performed by the AI engine 163 and obtained from the extractor 162, the generator 161 selects a zoom region in the moving image, and creates the zoom region information including an area of the zoom region. After that, in generating the zoom region information, the generator 161 determines a magnification of a region including a subject selected as the enlarged-view target. The generator 161 then adds the magnification to the zoom region information, and outputs the zoom region information to the moving image recorder 12.

The extractor 162 extracts, from the moving image captured by the imager 11, the subjects included in the moving image and subject information items (information items) each on one of the subjects. Each of the subject information items includes at least one of: a name of the subject; a size of the subject; a position of the subject; presence or absence of a face of the subject; a facial expression of the subject; a motion of the subject; an orientation of the subject; the number of the subjects; brightness of the subject; and composition information on the subject. Specifically, the extractor 162, acting as a unit to control the AI engine 163, causes the AI engine 163 to analyze the moving image captured by the imager 11, and outputs to the generator 161 a result of recognition performed by the AI engine 163.

Note that the name of the subject includes a kind of the subject (such as a person, a dog, and a cat). If the subject is a person, the name of the subject includes his or her personal name.

Moreover, the composition information on the subject is on a frame of the moving picture. The composition information indicates how well or poorly the frame is composed with the subject and a background of the subject. More specifically, the composition information preferably includes an evaluation value of the composition.

The AI engine 163 includes a plurality of AI engines. Each of the AI engines employs a unique technique to analyze the moving image and perform recognition of a subject included in the moving image. The AI engines output a result of the recognition through the extractor 162 to the generator 161. For example, an AI engine 1631 performs composition determination on the moving image. The composition determination involves determining whether an evaluation value of composition of an image after zooming-in is higher than or equal to a predetermined value. The AI engine 1631 learns an image recognized to be commonly well composed, and assigns a high score (a high evaluation value) to a moving image close to the well composed image.

An AI engine 1632 performs object recognition on the moving image. The object recognition involves recognizing such a specific object as a person, a dog, and a cat in the moving image. An AI engine 1633 performs personal recognition on the moving image. The personal recognition involves recognizing a previously registered person in the moving image.

Note that the AI engine 163 may include any given number of A engines, and may employ determination and recognition techniques other than the above ones. Moreover, the AI 163 does not have to perform personal recognition. That is, the AI engine 163 does not have to include the AI engine 1633 for personal recognition.

Functional Configuration of Display Control Apparatus 3

As illustrated in FIG. 2, the imaging apparatus 3 includes: the display controller 31; and a selector 35.

The display controller 31 causes the display apparatus 4 to display the moving image data 21 stored in the storage apparatus 2. When the selector 35 identifies an enlarged-view target, the display controller 31 zooms in on (enlarges) a region including a subject identified as the enlarged-view target, and causes the display apparatus 4 to display the moving image data 21. The zoom region information includes: an area of a region including a subject; and a magnification of the region. Note that the display controller 31 may zoom out (reduce) the region including the subject.

With reference to the zoom region information 22 stored in the storage apparatus 2, the selector 35 identifies an enlarged-view target from among the subjects included in the moving image data 21. Note that, in reproduction, the selector 35 may select the enlarged-view target; namely, a zoom region (selecting an enlarged-view target).

The imaging apparatus 1 and the display control apparatus 3 may be combined together. In such a case, the imaging apparatus 1 and the display apparatus 4 may be controlled by an image display control apparatus including the extractor 162, the generator 161, the selector 35, and the display controller 31.

Processing of Imaging Apparatus 1

Figure 3:
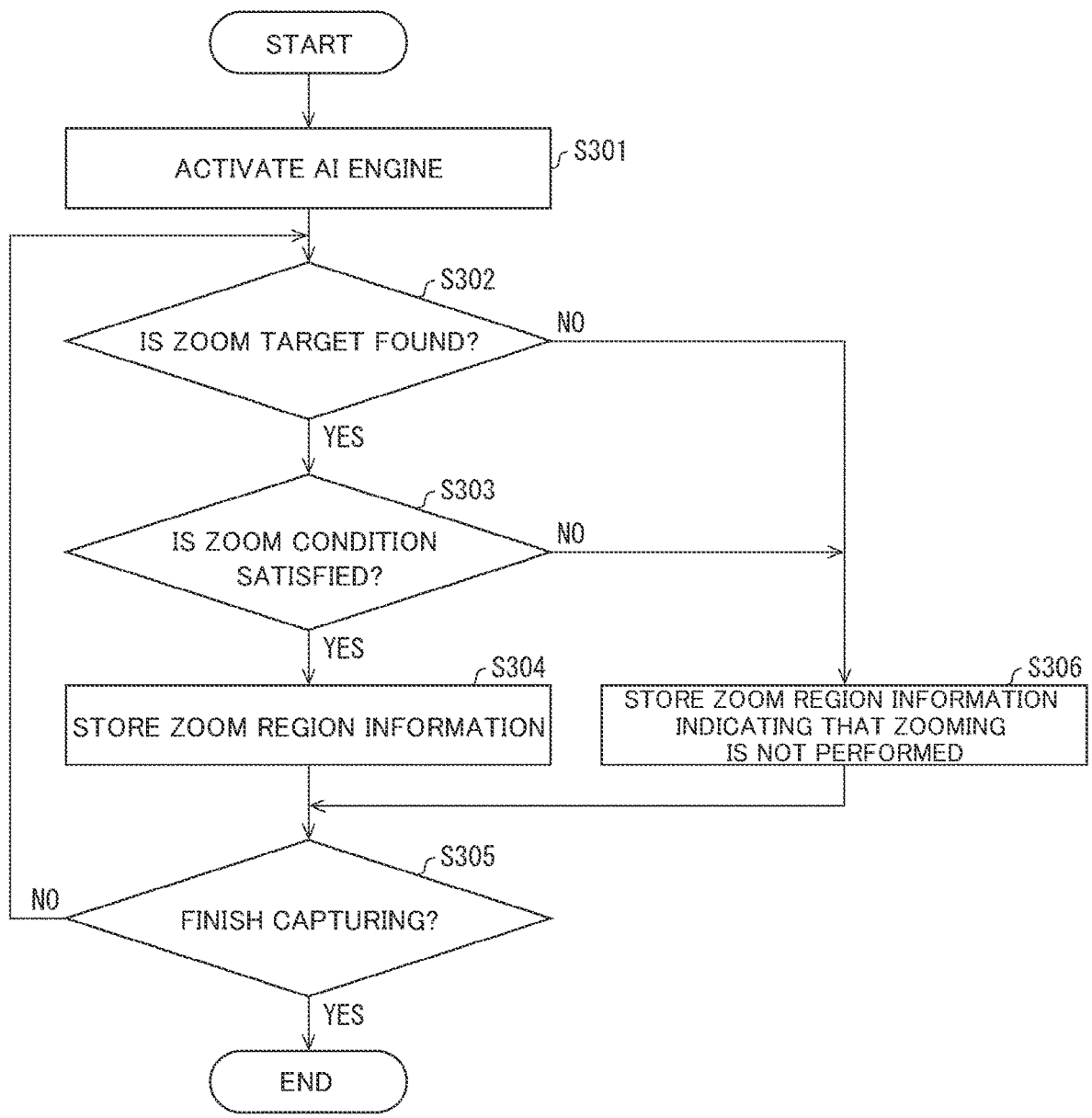
FIG. 3 is a flowchart showing processing of an imaging apparatus according to the first embodiment of the present invention.
Figure 5:
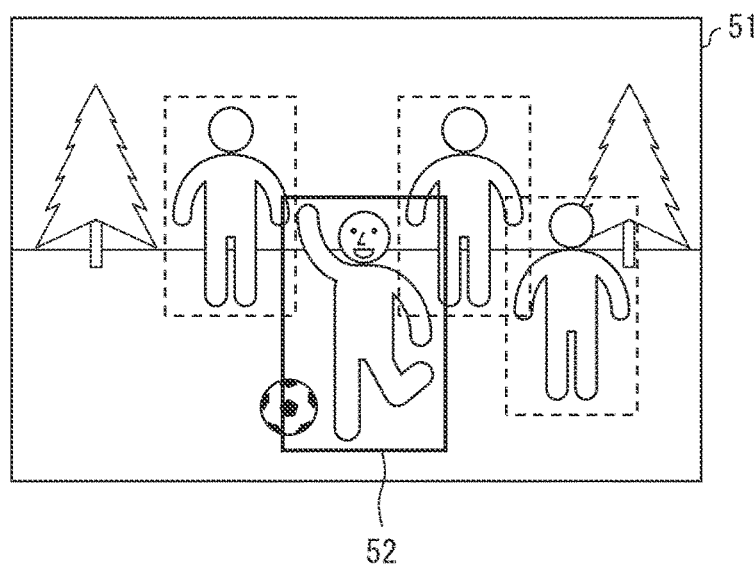
FIG. 5 is a drawing illustrating an example of a frame of a moving image according to the first embodiment of the present invention.

FIG. 3 is a flowchart showing processing of the imaging apparatus 1 according to this embodiment. FIG. 5 is a drawing illustrating an example of a frame of a moving image according to this embodiment. Described below is the processing of the imaging apparatus 1, with reference to FIGS. 3 and 5.

The processing of the imaging apparatus 1 starts when, for example, the user activates a camera application installed in such a device as a smartphone. When the camera application is activated, the imager 11 captures a moving image. After that, the moving image recorder 12 causes the storage apparatus 2 to store the moving image, captured by the imager 11, as the moving image data 21.

Step S301

The controller 16 of the imaging apparatus 1 activates the AI engine 163. Here, the extractor 162 activates at least one AI engine, or two or more AI engines, of the A engine 163, depending on the performance of the CPU 13 and the capacity of the memory 15 of the imaging apparatus 1.

Step S302

Using the AI engine 163 already activated at Step S301, the extractor 162 of the controller 16 determines whether a zoom target is found in the moving image captured while the AI engine 163 is operating. A result of the determination the presence or absence of the zoom target varies, depending on the AI engines of the AI engine 163.

For example, the AI engine 1631 determines whether a well-composed image (having an evaluation value of the composition higher than or equal to a predetermined value) is found among images enlarged in the moving image. The "images enlarged in the moving image" are of enlarged regions including objects and people extracted by AI engines other than the AI engine 1631.

The AI engine 1632 determines whether the moving image includes a specific object such as a person, a dog, and a cat. The A engine 1633 determines whether the moving image includes a previously registered person. Note that the controller 16 may determine the presence or absence of the zoom target, employing other techniques than the above ones.

If the zoom target is found in the moving image (YES at Step S302), the controller 16 makes a determination of Step S303. Here, before the controller 16 makes the determination of Step S303, the extractor 162 extracts subjects and information items each on one of the subjects (extracting subjects and information items). For example, as illustrated in FIG. 5, generated on the moving image 51 are rectangular frames, of solid and dashed lines, indicating that the subjects are zoom targets.

If no zoom target is found in the moving image (NO at Step S302), the controller 16 carries out the processing of Step S306.

Step S303

The controller 16 determines whether the moving image satisfies a zoom condition, using the AI engine 163. This is to further determine whether one or more zoom targets, determined to be found in the moving image at Step S302, are to be actually enlarged and displayed.

For example, the AI engine 163 calculates, under each of the conditions below, a score of each zoom target identified with a rectangular frame. The extractor 162 outputs each of the calculated scores to the generator 161. The generator 161 weighs the scores of each of the zoom targets in accordance with a priority of the conditions below, and sums up the weighed scores. On the basis of the total sums, the generator 161 determines whether each of the zoom targets satisfies the zoom conditions. The generator 161 may evaluate in particular, a size of a subject, a position of the subject, the presence or absence of a face of the subject, and a facial expression of the subject, and calculate scores for each zoom target:

a size of a subject (i.e., a predetermined size or larger);
  a position of the subject in the moving image (i.e., substantially a center of the image);
  the presence or absence of a face of the subject (i.e., whether the subject includes a face);
  a facial expression of the subject (i.e., whether the face has a smile);
  a motion of the subject;
  an orientation of the subject;
  the number of the subjects;
  brightness of the subject; and
  composition of the subject.

If the moving image satisfies the zoom conditions (YES at Step S303), the controller 16 carries out the processing of Step S304. If the moving image does not satisfy the zoom conditions (NO at Step S303), the controller 16 carries out the processing of Step S306.

Step S304

The generator 161 of the controller 16 selects an actual enlarged-view target from among the one or more zoom targets satisfying the zoom conditions. The generator 161 may select a zoom target having a large total sum of the scores calculated at Step S303 under the conditions. For example, as illustrated in FIG. 5, the generator 161 selects, as the enlarged-view target, a subject included in a rectangular frame 52 of a solid line in the moving image 51.

Hence, the generator 161 generates zoom region information on the selected enlarged-view target (generating zoom region information), and outputs the generated zoom region information to the moving image recorder 12. The moving image recorder 12 obtains the zoom region information from the generator 161, and stores the obtained zoom region information, in the storage apparatus 2, as the zoom region information 22.

Step S305

The controller 16 determines whether to finish capturing. For example, the controller 16 determines whether the user has carried out an operation, using a screen of a camera application, to command an end of capturing.

If finishing capturing, (YES at Step S305), the controller 16 closes the imaging application, and finishes capturing. If not finishing capturing (NO at Step S305), the controller 16 returns to the determination at Step S302.

Step S306

If the moving image does not include a zoom target, or the moving image does not satisfy the zoom conditions, the generator 161 outputs, to the moving image recorder 12, zoom region information indicating that zooming is not performed. The moving image recorder 12 obtains the zoom region information from the generator 161, and stores the obtained zoom region information, in the storage apparatus 2, as the zoom region information 22.

Note that, other than the above case, if, for example, the user is moving while using the imaging apparatus 1, the controller 16 may suspend zooming since the moving image to be captured is shaky. Whether the user is in motion is determined using, for example, an acceleration sensor embedded in the imaging apparatus 1.

Processing of Display Control Apparatus 3

Figure 4:
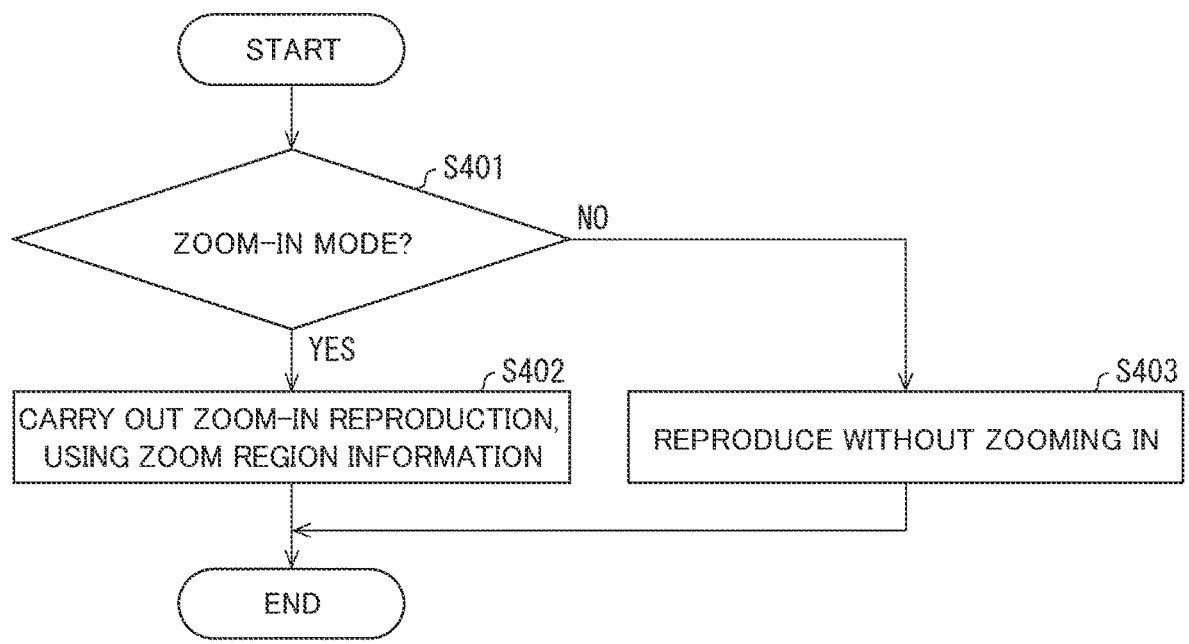
FIG. 4 is a flowchart showing processing of a display control apparatus according to the first embodiment of the present invention.
Figure 6:
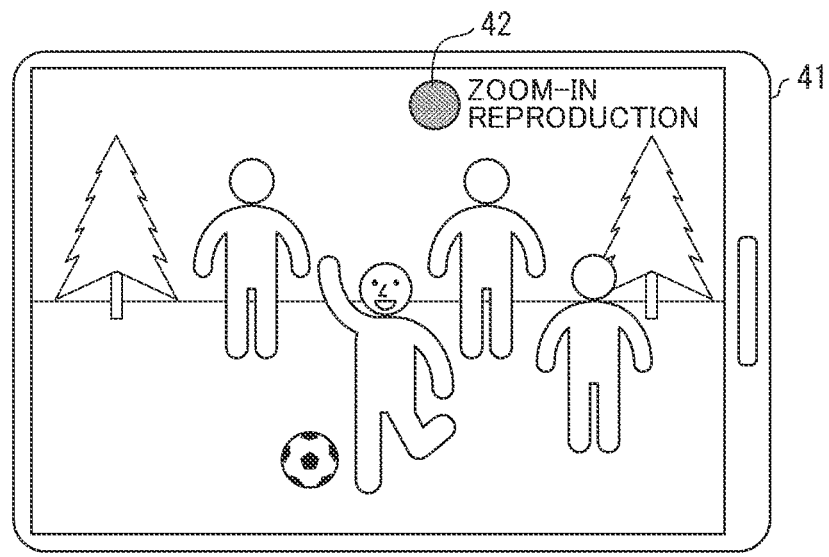
FIG. 6 is a drawing illustrating an example of a screen of a display apparatus according to the first embodiment of the present invention.
Figure 7:
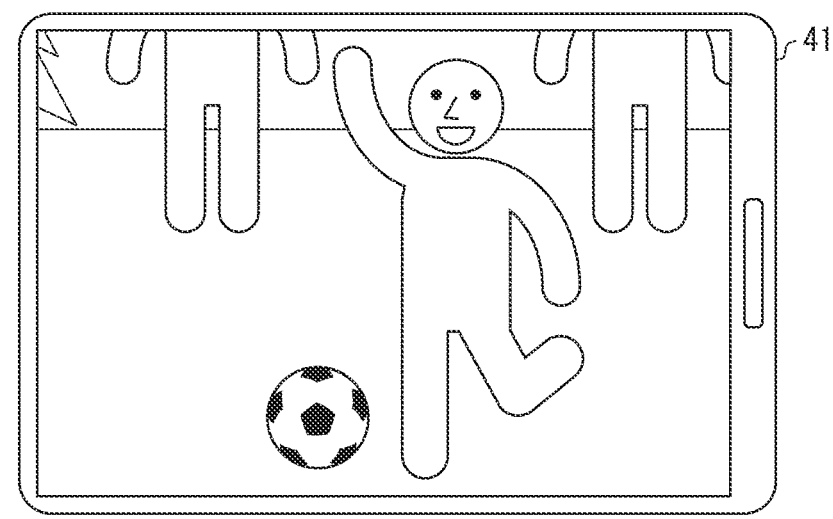
FIG. 7 is a drawing illustrating an example of the screen of the display apparatus according to the first embodiment of the present invention.

FIG. 4 is a flowchart showing processing of the display control apparatus 3 according to this embodiment. FIGS. 6 and 7 are drawings illustrating examples of a screen 41 of the display apparatus 4 according to this embodiment.

Described below is the processing of the display control apparatus 3, with reference to FIGS. 4, 6, and 7.

The processing of the display control apparatus 3 starts when, for example, the user activates a moving image reproduction application installed in such a device as a smartphone. When the moving image reproduction application is activated, the display controller 31 reproduces the moving image. That is, the display controller 31 causes the display apparatus 4 to display the moving image data 21 stored in the storage apparatus 2. When displayed, the moving image data 21 is left unchanged in size without zooming.

After that, in displaying the moving image, the display controller 31 switches between a full-screen view of the moving image data 21 and an enlarged view of a subject included in the moving image data 21, in response to a user operation during the reproduction of the moving image. When the moving image reproduction processing transits to a zoom-in mode to display an enlarged view of a subject included in the moving image data 21, the display controller 31 zooms in on, and reproduces (zoom-in reproduction), a region identified with the zoom region information 22. Note that the display control apparatus 3 is an appliance capable of reproducing a moving image.

Step S401

The selector 35 determines whether the moving image reproduction processing is in the zoom-in mode. For example, as illustrated in FIG. 6, the display control apparatus 3 causes the display apparatus 4 to display, on the screen 41, a zoom-in reproduction button 42 that the user operates to display a subject in an enlarged view. When the user touches the zoom-in reproduction button 42, the moving image reproduction processing of the display control apparatus 3 transits to the zoom-in mode. Note that when the user touches the zoom-in reproduction button 42 again, or when the zoom-in reproduction is carried out for a predetermined time period, the zoom-in mode is cleared.

If the moving image reproduction processing is in the zoom-in mode (YES at Step S401), the selector 35 carries out the processing of Step S402. If the moving image reproduction processing is not in the zoom-in mode (NO at Step S401), the selector 35 carries out the processing of Step S403.

Step S402

The display control apparatus 3 carries out zoom-in reproduction, using zoom region information. Specifically, with reference to the zoom region information 22 stored in the storage apparatus 2, the selector 35 identifies an enlarged-view target from among the subjects included in the moving image data 21. After that, the display controller 31 enlarges a region including the enlarged-view target selected by the selector 35, and causes the display apparatus 4 to display the moving image data 21 (displaying the moving image). For example, the display controller 31 presents the screen 41 illustrated in FIG. 7. The screen 41 includes an image of the enlarged region in the rectangular frame 52 in FIG. 5.

Note that, if the zoom region information 22 indicates that zooming is not performed, the display controller 31 may either cause the display apparatus 4 to display a notice that the zoom-in reproduction commanded by the user is unavailable, or display the moving image data 21 in a full screen without displaying the notice.

Moreover, if the subject to be an enlarged-view target moves out of the frame, and no other zoom-target subject is found, the display control apparatus 3 returns to the reproduction of the moving image without zooming.

Furthermore, if the moving image data 21 includes two or more subjects as enlarged-view targets, the display controller 3 may, thorough a user operation, refer to the zoom region information, and switch the enlarged-view target from a subject as the current target-on-track (the enlarged-view target) to another subject with the second-highest priority (having a large total sum of the scores).

Step S403

The selector 35 does not select an enlarged-view target from the subjects included in the moving image data 21. Hence, the display controller 31 continues to reproduce the moving image data 21 with its size left unchanged without zooming in.

Advantageous Effects of First Embodiment

In the image display system 100 according to this embodiment, the imaging apparatus 1 calculates a target-on-track and a magnification from information obtained from a subject, and generates zoom region information (i.e., information for zooming including a position of a zoom frame surrounding the target and a subject ID). If the subject to be zoomed includes two or more subjects, the subject ID, an identifier, can identify each of the subjects. With reference to the zoom region information, the display control apparatus 3 generates, from the moving image data 21 obtained and stored, a moving image in which the target-on-track is zoomed in, and reproduces the generated moving image.

Such features make it possible to determine a target-on-track when the moving image is obtained, and zoom in on the determined target. Hence, the user is freed from an operation to search for, and select, the target-on-track himself or herself.

Second Embodiment

Described below is a second embodiment of the present invention. Identical reference signs are used to denote identical or substantially identical components between the first embodiment and the second embodiment, and such components will not be elaborated upon here.

The image display system 100 according to this embodiment generates zoom region information when a moving image is obtained, and further generates other zoom region information when the moving image is reproduced. With reference to the both kinds of information, the image display system 100 carries out zoom-in reproduction of the moving image.

For example, the imaging apparatus 1 generates zoom region information 22a (not shown) including scores of the subjects, using the A engine 1631 performing composition determination. The display control apparatus 3 generates zoom region information 22b (not shown) including scores of the subjects, using the A engine 1632 performing object recognition and the AI engine 1633 performing personal recognition. With reference to the zoom region information 22a and the zoom region information 22b, the selector 35 of the display control apparatus 3 causes the display controller 31 to enlarge and display a region including a subject having the highest score.

Here, the imaging apparatus 1 does not determine an enlarged-view target in the moving image. Instead, the display control apparatus 3 determines the target in the moving image, enlarges a region including the target, and causes the display apparatus 4 to display the enlarged region.

Note that if the image display system 100 is a smartphone including the imaging apparatus 1 and the display control apparatus 3 combined together, the AI engines 1631, 1632, and 1633 may selectively be used as appropriate for imaging and reproduction, depending on the performance of the smartphone.

Advantageous Effects of Second Embodiment

In the imaging display system 100 according to this embodiment, the AI engines perform composition determination, object recognition, and personal recognition. Hence, the imaging apparatus 1 could be short of sufficient performance. In such a case, the AI engines of the display control apparatus 3 share some of the operations of the imaging apparatus 1, making it possible to ensure accuracy in selecting a zoom target.

Third Embodiment

Described below is a third embodiment of the present invention. Identical reference signs are used to denote identical or substantially identical components between the first and second embodiments and the second embodiment, and such components will not be elaborated upon here.

Figure 8:
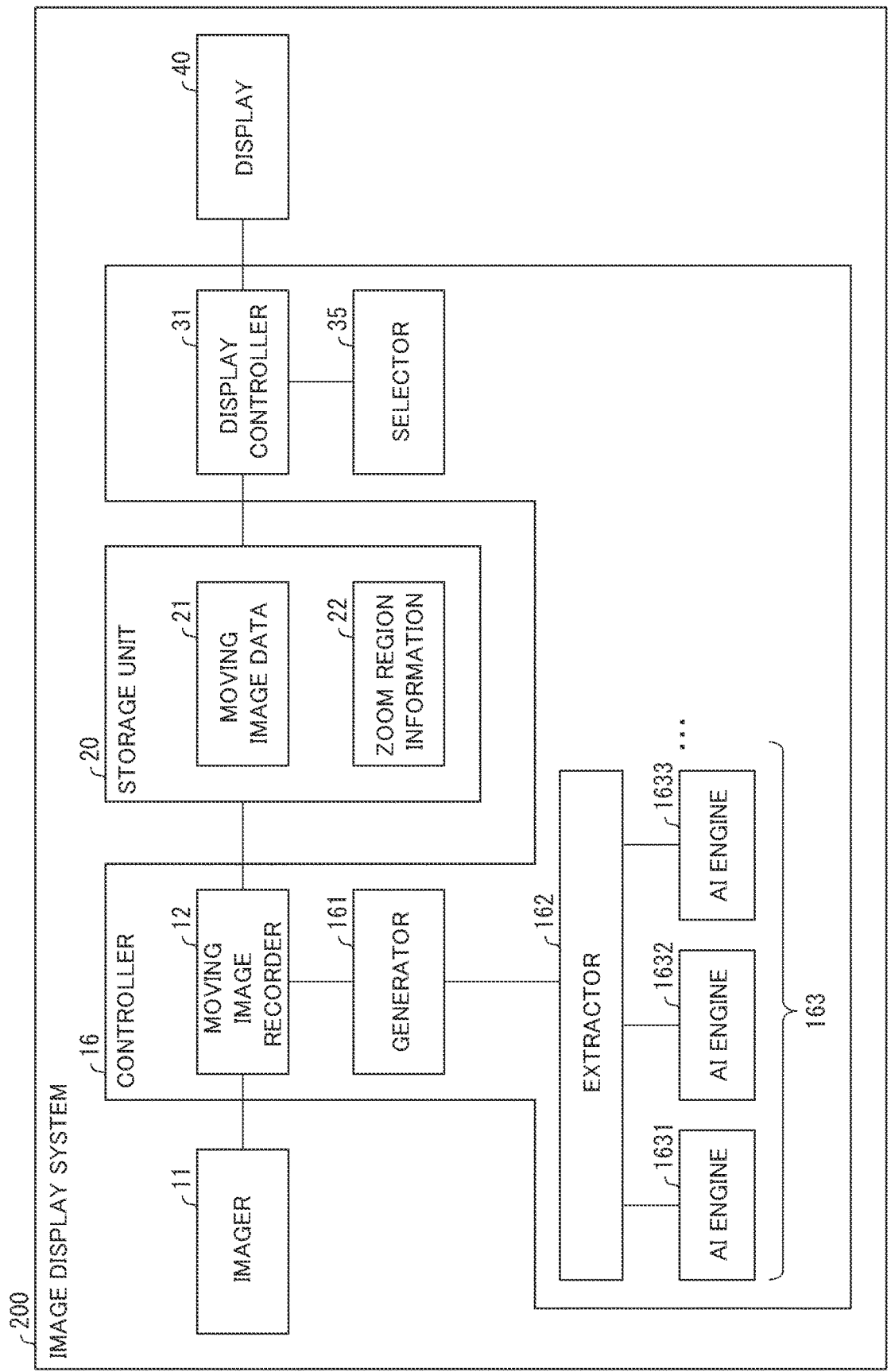
FIG. 8 is a block diagram illustrating a functional configuration of an image display apparatus according to a third embodiment of the present invention.

FIG. 8 is a block diagram illustrating a functional configuration of an image display apparatus 200 according to this embodiment. The image display apparatus (an electronic appliance) 200 includes: the imager 11, the controller 16; a storage unit 20; and a display 40. The controller 16 includes: the moving image recorder 12; the generator 161; the extractor 162; the AI engine 163; the display controller 31; and the selector 35. The storage unit 20 is the same in function as the storage apparatus 2. The display 40 is the same in function as the display apparatus 4. The components of the controller 16 are the same as those described in the first and second embodiments.

The configuration of the image display apparatus 200 is employed when the functions of the present invention are achieved by, for example, a smartphone or a tablet alone.

Software Implementation

The control blocks of the imaging apparatus 1 and the display control apparatus 3 (particularly, the units of the controller 16) may be implemented by logic circuits (hardware) fabricated, for example, in the form of an integrated circuit (IC chip) and may be implemented by software.

In the latter case, the imaging apparatus 1 and the display control apparatus 3 include a computer that executes instructions from programs or software by which various functions are implemented. This computer includes, for example, at least one processor (a control apparatus) and at least one computer-readable storage medium storing the above programs. The processor of the computer then retrieves and runs the programs contained in the storage medium, thereby achieving the object of an aspect of the present invention. An example of the processor may include a central processing unit (CPU). An example of the storage medium may include a "non-transitory tangible medium" such as a tape, a disc/disk, a card, a semiconductor memory, or programmable logic circuitry, as well as a read-only memory (ROM). Moreover, the imaging apparatus 1 and the display control apparatus 3 may further include a random access memory (RAM) into which the programs are loaded. The programs may be supplied to the computer via any transmission medium (e.g., over a communications network or by broadcasting waves) that can transmit the programs. The present invention, in an aspect thereof, encompasses data signals on a carrier wave that are generated during electronic transmission of the programs.

Summary

An electronic appliance according to a first aspect of the present invention includes: an imaging apparatus; a display apparatus; and a control apparatus. The control apparatus: extracts, from a moving image captured by the imaging apparatus, subjects included in the moving image and information items each on one of the subjects; generates enlarged-view target information for selecting an enlarged-view target from among the subjects, with reference to the information items; selects the enlarged-view target from among the subjects, with reference to the enlarged-view target information; and enlarges a region including the enlarged-view target, and causes the display apparatus to display the moving image.

Such features make it possible to display the subject in an enlarged view without a user operation. Note that the imaging apparatus and the display control apparatus may be combined together.

In the electronic appliance, of the first aspect, according to a second aspect of the present invention, each of the information items may include at least one of: a size of a subject included in the subjects; a position of the subject; presence or absence of a face of the subject; a facial expression of the subject; a motion of the subject; an orientation of the subject; the number of the subjects; brightness of the subject; and composition information on the subject.

In the electronic appliance, of the first or second aspect, according to a third aspect of the present invention, in the generation of the enlarged-view target information, a magnification of the region is determined with reference to the information item on a subject included in the subjects and selected as the enlarged-view target.

Such features make it possible to enlarge the region including the subject, using the determined magnification.

In the electronic appliance, of the first to third aspects, according to a fourth aspect of the present invention, in the display of the moving image, a full-screen view of the moving image and an enlarged view of a subject included in the moving image are switched therebetween in response to a user operation. Here, the subject is included in the subjects.

Such a feature makes it possible for the user to readily switch between the full-screen view of the moving image and the enlarged view of the subject.

An image display control apparatus according to a fifth aspect of the present invention controls an imaging apparatus and a display apparatus. The image display control apparatus includes: an extractor extracting, from a moving image obtained by the imaging apparatus, subjects included in the moving image and information items each on one of the subjects; a generator generating enlarged-view target information for selecting an enlarged-view target from among the subjects, with reference to the information items; a selector selecting the enlarged-view target from among the subjects, with reference to the enlarged-view target information a display controller enlarging a region including the enlarged-view target, and causing the moving image to be displayed.

An image displaying system according to a sixth aspect of the present invention includes: an imaging apparatus; and a display control apparatus. The imaging apparatus includes: an imager capturing a moving image; an extractor extracting, from the moving image, subjects included in the moving image and information items each on one of the subjects; and a generator generating enlarged-view target information for selecting an enlarged-view target from among the subjects, with reference to the information items. The display control apparatus includes: a selector selecting the enlarged-view target from among the subjects, with reference to the enlarged-view target information; and a display controller enlarging a region including the enlarged-view target, and causing the moving image to be displayed.

An image display control method according to a seventh aspect of the present invention is for controlling an imaging apparatus and a display apparatus. The image display control method includes: extracting, from a moving image captured by the imaging apparatus, subjects included in the moving image and information items each on one of the subjects; generating enlarged-view target information for selecting an enlarged-view target from among the subjects, with reference to the information items; selecting the enlarged-view target from among the subjects, with reference to the enlarged-view target information; and enlarging a region including the enlarged-view target, and causing the display apparatus to display the moving image.

An image display control apparatus according to the embodiments of the present invention may be achieved in the form of a computer. In such a case, a control program of the image display control apparatus causing the computer to run as the units (software elements) included in the above image display control apparatus and to implement the image display control apparatus, and a computer-readable storage medium storing the control program are included in the scope of the present invention.

The present invention shall not be limited to the embodiments described above, and can be modified in various manners within the scope of claims. The technical aspects disclosed in different embodiments are to be appropriately combined together to implement another embodiment. Such an embodiment shall be included within the technical scope of the present invention. Moreover, the technical aspects disclosed in each embodiment may be combined to achieve a new technical feature. While there have been described what are at present considered to be certain embodiments of the invention, it will be understood that various modifications may be made thereto, and it is intended that the appended claim cover all such modifications as fall within the true spirit and scope of the invention.

What is claimed is:

1. An electronic appliance, comprising:
an imaging apparatus; a display apparatus; and a control apparatus,
the control apparatus being configured to, when capturing a moving image:
extract, from the moving image captured by the imaging apparatus, a plurality of subjects included in the moving image and information items each on one of the plurality of subjects;
generate enlarged-view target information for selecting an enlarged-view target from among the plurality of subjects, with reference to the information items; and
cause a storage apparatus to store the moving image and the enlarged-view target information, and
the control apparatus being further configured to, when reproducing the moving image stored in the storage apparatus:
select the enlarged-view target from among the plurality of subjects, with reference to the enlarged-view target information; and
enlarge a region including the enlarged-view target included in the moving image, and cause the display apparatus to display the enlarged region, including the enlarged-view target, on all over a screen of the display apparatus, wherein:
when reproducing the moving image stored in the storage apparatus, in causing the display apparatus to display the enlarged region, including the enlarged-view target, on all over the screen of the display apparatus, a full-screen view of the moving image and an enlarged view of a subject included in the moving image are switched therebetween in response to a user operation, the subject being included in the plurality of subjects, and
each of the information items includes at least one of: a size of a subject included in the plurality of subjects; a position of the subject; a facial expression of the subject; a motion of the subject; an orientation of the subject; a number of the plurality of subjects; brightness of the subject;
and composition information on the subject.

2. The electronic appliance according to claim 1, wherein in the generation of the enlarged-view target information, a magnification of the region is determined with reference to the information item on one of the plurality of subjects included in the moving image and selected as the enlarged-view target.

3. An image displaying system, comprising:
an imaging apparatus; and a display control apparatus,
the imaging apparatus including:
an imager configured to capture a moving image;
an extractor configured to extract, from the moving image, a plurality of subjects included in the moving image and information items each on one of the plurality of subjects; and
a generator configured to generate enlarged-view target information for selecting an enlarged-view target from among the plurality of subjects, with reference to the information items, and
a storer configured to cause a storage apparatus to store the moving image and the enlarged-view target information, and
the display control apparatus including:
a selector configured to select the enlarged-view target from among the plurality of subjects, with reference to the enlarged-view target information, when reproducing the moving image stored in the storage apparatus; and
a display controller configured to enlarge a region including the enlarged-view target included in the moving image, and cause the enlarged region, including the enlarged-view target, on all over a screen of a display apparatus, to be displayed, wherein:
when reproducing the moving image stored in the storage apparatus, in causing the display apparatus to display the enlarged region, including the enlarged-view target, on all over the screen of the display apparatus, a full-screen view of the moving image and an enlarged view of a subject included in the moving image are switched therebetween in response to a user operation, the subject being included in the plurality of subjects, and
each of the information items includes at least one of: a size of a subject included in the plurality of subjects; a position of the subject; a facial expression of the subject; a motion of the subject; an orientation of the subject; a number of the plurality of subjects; brightness of the subject;
and composition information on the subject.

4. An image display control method for controlling an imaging apparatus and a display apparatus, the image display control method comprising:

when capturing a moving image;
extracting, from the moving image captured by the imaging apparatus, a plurality of subjects included in the moving image and information items each on one of the plurality of subjects;
generating enlarged-view target information for selecting an enlarged-view target from among the plurality of subjects, with reference to the information items; and
causing a storage apparatus to store the moving image and the enlarged-view target information, and when reproducing the moving image stored in the storage apparatus;
selecting the enlarged-view target from among the plurality of subjects, with reference to the enlarged-view target information; and
enlarging a region including the enlarged-view target included in the moving image, and causing the display apparatus to display the enlarged region, including the enlarged-view target, on all over a screen of the display apparatus, wherein:

when reproducing the moving image stored in the storage apparatus, in causing the display apparatus to display the enlarged region, including the enlarged-view target, on all over the screen of the display apparatus, a full-screen view of the moving image and an enlarged view of a subject included in the moving image are switched therebetween in response to a user operation, the subject being included in the plurality of subjects, and each of the information items includes at least one of: a size of a subject included in the plurality of subjects; a position of the subject; a facial expression of the subject; a motion of the subject; an orientation of the subject; a number of the plurality of subjects; brightness of the subject; and composition information on the subject.

5. The electronic appliance according to claim 1, wherein
the control apparatus is further configured to calculate scores for each one of the plurality of subjects with reference to the information items, and select the enlarged-view target in accordance with the scores for each one of the plurality of subjects, and
the enlarged-view target information identifies the selected enlarged-view target.

6. An electronic appliance, comprising:
an imaging apparatus; a display apparatus; and a control apparatus,
the control apparatus being configured to, when capturing a moving image:
extract, from the moving image captured by the imaging apparatus, a plurality of subjects included in the moving image and information items each on one of the plurality of subjects;
generate enlarged-view target information for selecting an enlarged-view target from among the plurality of subjects, with reference to the information items; and
cause a storage apparatus to store the moving image and the enlarged-view target information, and
the control apparatus being further configured to, when reproducing the moving image stored in the storage apparatus:
select the enlarged-view target from among the plurality of subjects, with reference to the enlarged-view target information; and
enlarge a region including the enlarged-view target included in the moving image, and cause the display apparatus to display the enlarged region, including the enlarged-view target, on all over a screen of the display apparatus, wherein
when reproducing the moving image stored in the storage apparatus, in causing the display apparatus to display the enlarged region, including the enlarged-view target, on all over the screen of the display apparatus, a full-screen view of the moving image and an enlarged view of a subject included in the moving image are switched therebetween in response to a user operation, the subject being included in the plurality of subjects.

* * * * *